Figure 1:
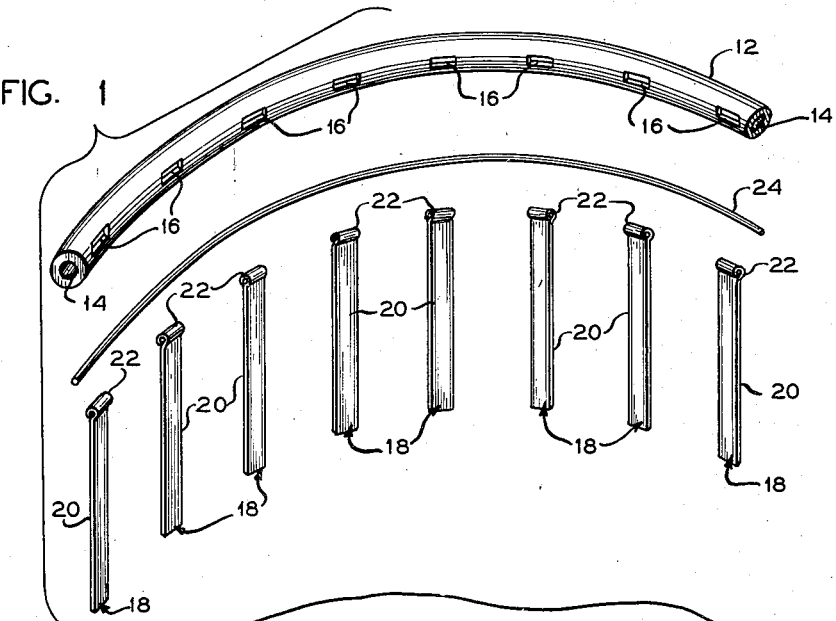

Jan. 20, 1953 C. D. WEST 2,626,164
UNIVERSAL FENDER WELT
Filed Aug. 4, 1950 2 SHEETS—SHEET 1

INVENTOR.
C. D. WEST
BY
A. Yates Dowell
ATTORNEY

Jan. 20, 1953 — C. D. WEST — 2,626,164
UNIVERSAL FENDER WELT
Filed Aug. 4, 1950 — 2 SHEETS—SHEET 2

INVENTOR.
C. D. WEST
BY
A. Yates Dowell
ATTORNEY

Patented Jan. 20, 1953

2,626,164

UNITED STATES PATENT OFFICE 2,626,164

UNIVERSAL FENDER WELT

Charles D. West, Orlando, Fla.

Application August 4, 1950, Serial No. 177,631

10 Claims. (Cl. 280—153.5)

1

This invention relates to automobile bodies and more particularly to a universal fender welt adapted to cover and seal the joints between contiguous portions of automobile bodies, such as the joint between the fender and one of the upper quarter panels, and the method of applying the fender welt.

Heretofore, fender welts have consisted of a sealing portion with a long paper or cloth flange which is held in place by inserting the flange between the body and the fender and tightening the bolts that hold the fender to the body. This type of fender welt can only be replaced by taking the fender off of the body which makes replacement too costly because of the labor and material involved.

Another type of welt consists of a sealing portion with sharp corrugated metal pieces spaced at intervals along its length, and is held in place by driving the pieces between the body and the fender, but, since the space between the fender and the body varies considerably on different cars, it is almost impossible to obtain a tight and secure fit in all cases, and hammering damages the welt.

An object of the present invention is to overcome the disadvantages enumerated above and to provide a simple and inexpensive universal fender welt which is applicable to all types of automobile bodies and which may also be used in connection with other types of construction where a sealing and covering welt may be desired.

Another object of the present invention is to provide a fender welt which is securely held in position regardless of the space between the contiguous portions of the body.

A still further object of the invention is the provision of a novel fender welt which is applicable without necessitating the loosening or removal of the fender.

The universal fender welt of the present invention includes a plurality of elongated clips or pins, each having a rolled-over top edge forming an eye which is inserted in one of a series of longitudinally spaced slits in a length of plastic tubing. The clips are anchored securely in the tubing by a wire which is inserted axially therethrough and extends through the rolled-over top edge of each of the metal clips. The clips are pushed between the fender and the body and the outer ends of the longer anchor or lock clips are bent over on the underside to hold the welt securely in place, and the free ends of the wire are pulled tight under the fender and attached to adjacent clips. If necessary, where the spacing is extremely close, an applicator tool or chisel may be used to form slots or clearance for the insertion of the clips.

Figure 2:
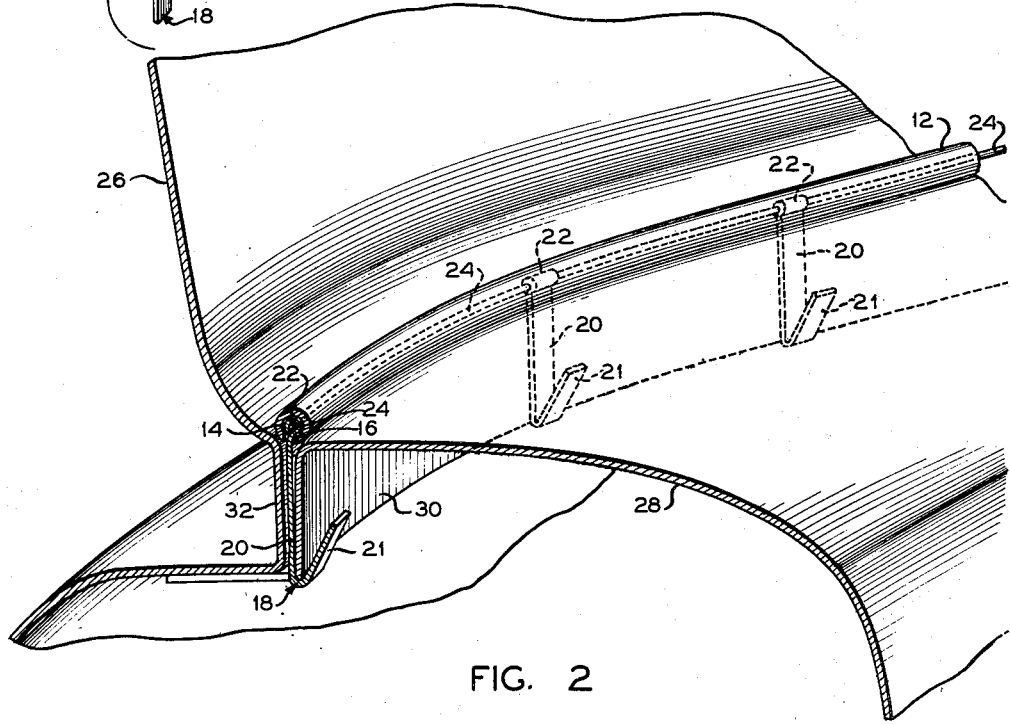
Figure 3:
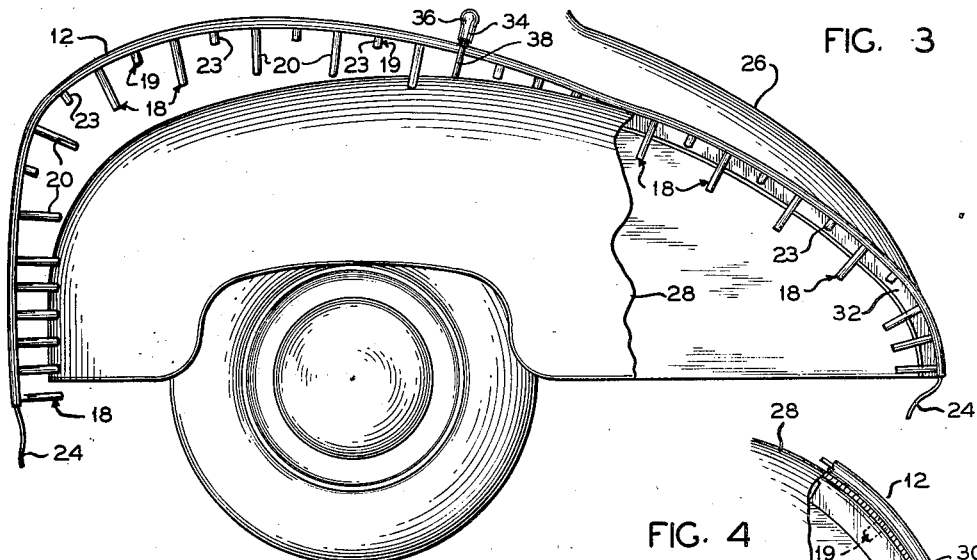
Figure 4:
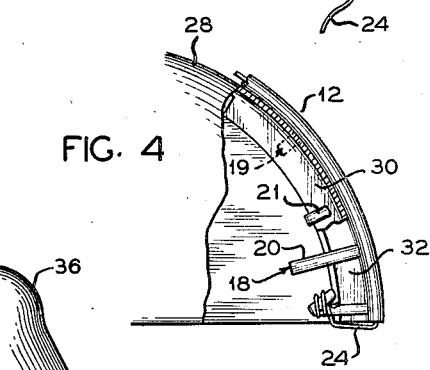
Figure 5:
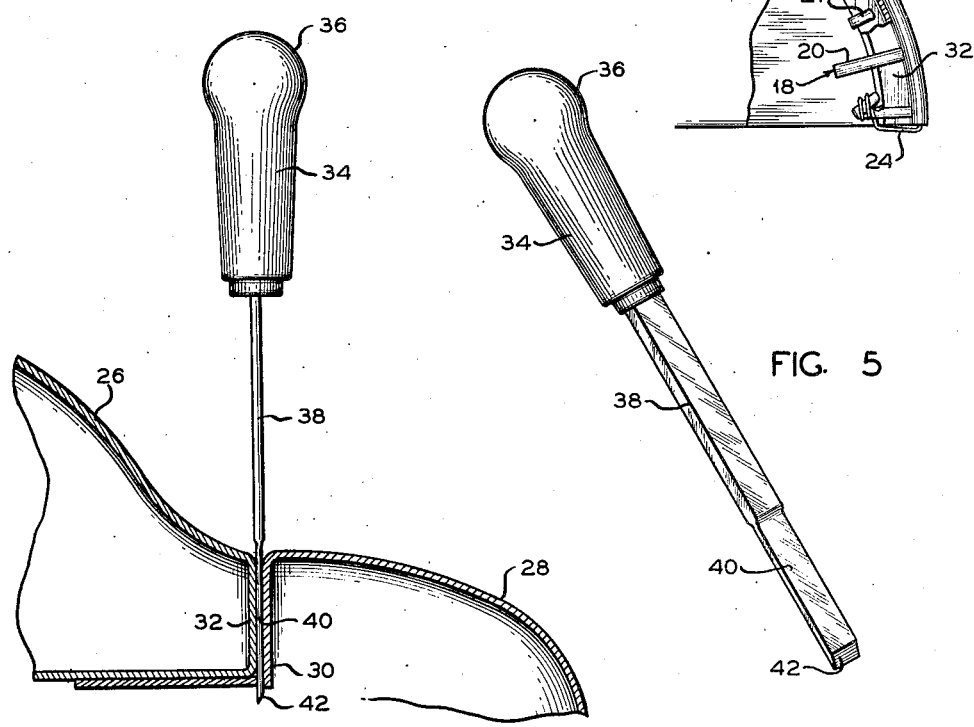

Further objects and advantages of the invention will be apparent from the following description taken in conjunction with the drawings, wherein:

Fig. 1 is an exploded perspective view showing the separate parts of one preferred form of the present invention;

Fig. 2 a fragmentary sectional view in perspective showing the universal fender welt in position along the joint between the upper quarter panel and the fender of an automobile body with the clips extending between a portion of the upper quarter panel and the fender flange and bent around the lower edge of the fender flange;

Fig. 3 a side elevational view with portions broken away illustrating one preferred method of applying a slightly modified form of fender welt;

Fig. 4 a fragmentary sectional view on an enlarged scale of one end portion of the fender and welt shown in Fig. 3 illustrating the preferred manner of securing the wire end to an adjacent clip;

Fig. 5 a perspective view of one preferred form of applicator tool, and

Figure 6:
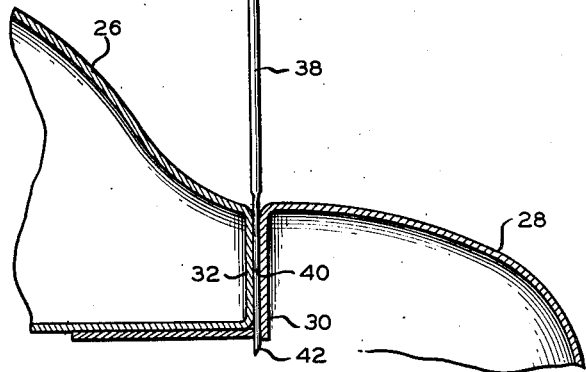

Fig. 6 a sectional view illustrating the manner of using the applicator tool shown in Fig. 5.

Referring now to the drawings in detail, a section of plastic tubing 12 is provided with a longitudinal bore 14. A plurality of elongated slits 16 extend through the side walls of the tubing 12 in spaced relation along one edge thereof. A plurality of clips 18 are provided with elongated, thin, flat shank portions 20 and a rolled-over top edge or eye 22. The eyes 22 are each inserted in one of the slits 16, and wire 24 is inserted through the longitudinal bore 14 and each of the eyes 22 to securely hold the clips in position with relation to the plastic tubing 12.

One typical application of the present invention is illustrated in Fig. 2 wherein the universal fender welt is used to seal and cover the joint between the upper quarter panel 26 and the fender 28 of a conventional automobile body. As shown, the fender 28 is provided with a flange 30 which is secured in spaced parallel relation to a portion 32 of the upper quarter panel 26.

The clips 18 have their shank portions 20 inserted between the flange 30 and the portion 32 and the lower end 21 of the shank is bent over the flange, as shown, after the plastic tubing 12 has been firmly positioned over the joint.

It is obvious that this fender welt will be held securely in position regardless of the spacing or gap between the flange 30 and the portion 32 and, if necessary, when the contiguous parts of the body are too close to permit ready insertion of the shank 20, a suitable applicator tool, such as that shown in Fig. 5 or a long nose chisel, can be driven between the contiguous portions 30 and 32 to provide sufficient space for insertion of the clip, as illustrated in Fig. 6.

The applicator tool, as shown in Figs. 5 and 6, has a handle 34 with a rounded upper portion 36 which will engage the palm of the hand. A thick, heavy shank portion 38 is suitably secured to the lower portion of the handle 34 and is provided with a thin blade 40 of approximately the same thickness as the shanks 20 and 23 of clips 18 and 19 or slightly thicker.

The blade 40 is somewhat longer than the flange 30 and terminates in a bevelled edge 42 which facilitates insertion between the contiguous portions 30 and 32 of the fender 28 and body 26.

Usually pressure from the palm of the hand on the rounded portion 36 of handle 34 will be sufficient to force the tool between portions 30 and 32 to provide a slot or clearance for insertion of the clips 18 and 19. However, a hammer may be used if necessary, to drive the tool where the spacing is extremely close and tight.

One preferred manner of applying the fender welt between a fender 28 and the body 26 is illustrated in Figs. 3 and 4 in connection with a slightly modified form of fender welt wherein additional short clips or guide pins 19 are provided between certain of the longer anchor clips or lock pins 18.

The guide pins 19 are similar to anchor clips 18 but have a shank 23 which is substantially shorter than shank 20 and merely serves as an aid in maintaining the welt in position without requiring the additional step of bending the end of the shank over the fender flange 30.

Where more clearance is needed for insertion of the clips 18 and pins 19, the applicator tool is utilized to form a slot. After the first few clips have been inserted, the free end of wire 24 is wrapped around the end portion of shank 20 on the end clip 18 and the shank 20 is bent over, or a reverse bend may be formed in the shank 20 of end clip 18 and the free end of wire 24 wrapped around the bent shank 20 to securely hold one end of the fender welt.

Each successive slot is formed slightly ahead of the next clip or pin, and the tubing is stretched slightly before the next clip or pin is inserted in the slot thus formed.

The fender welt, as shown in Fig. 3 is somewhat longer than the actual length of the joint between fender 28 and body 26. This provides for the variation in the length of the joint in different makes and types of cars, so that only one length of fender welt may be adapted to any type of joint. The excess length of tubing 12 may be cut off and removed with any extra clips 18, and sufficient wire 24 left extending from the tubing 12 to wrap around the end clip 18.

The wire 24 which has been secured at the rear end of the fender as shown in Fig. 4, is pulled tight and the front end is secured to the opposite end clip 18 in a similar manner.

Whenever one of the longer anchor clips 18 happens to strike one of the bolts used for securing the fender 28 to the body 26, the shank 20 may be cut off to a shorter length.

It will be obvious that the clips 18 may be made in different lengths, when necessary to suit particular applications, and that the universal welt of the present invention may be applied to structures other than automobile bodies, where it is desired to seal and cover a joint between any two contiguous portions, regardless of the spacing therebetween. It is only necessary that there be some portion over which the end of the shank may be bent to securely hold the welt in position.

It will be obvious to those skilled in the art that various changes may be made in the invention, without departing from the spirit and scope thereof, and therefore the invention is not limited by that which is shown in the drawings and described in the specification, but only as indicated in the appended claims.

What is claimed is:

1. A fender welt comprising plastic tubing having a plurality of slits extending through the side walls thereof, said slits being spaced along one side of said tubing, a plurality of clips having an elongated flat shank portion and a rolled-over eye adjacent one end thereof, each of said eyes being of a size to be inserted through one of said slits and positioned within said tubing, and an elongated member extending through said tubing and through the eyes of each of said clips, certain of said clips being relatively long and formed of a relatively soft flexible metal whereby the ends of the shank portion may be bent over to securely hold the fender welt in position and other of said clips being relatively short to serve as guide pins.

2. A fender welt comprising plastic tubing having a plurality of slits extending through the side walls thereof, said slits being spaced along one side of said tubing, a plurality of clips having an elongated flat shank portion and a rolled-over eye adjacent one end thereof, each of said eyes being of a size to be inserted through one of said slits and positioned within said tubing, and an elongated member extending through said tubing and through the eyes of each of said clips, said clips being formed of a relatively soft flexible metal whereby the ends of the shank portion may be bent over to securely hold the fender welt in position, said wire extending outwardly from both ends of said tubing whereby the wire may be secured to the bent shank portion of an adjacent clip for securely holding said fender welt in position.

3. A fender welt comprising plastic tubing having a plurality of slits extending through the side walls thereof, said slits being spaced along one side of said tubing, a plurality of clips having an elongated flat shank portion and a rolled-over eye adjacent one end thereof, each of said eyes being of a size to be inserted through one of said slits and positioned within said tubing, and an elongated member extending through said tubing and through the eyes of each of said clips, said clips being formed of a relatively soft flexible metal whereby the ends of the shank portion may be bent over to securely hold the fender welt in position.

4. A fender welt comprising plastic tubing having a plurality of slits extending through the side walls thereof, a plurality of clips having an elongated flat shank portion and a rolled-over eye adjacent one end thereof, each of said eyes being of a size to be inserted through one of said slits and positioned within said tubing, and an elongated member extending through said tubing and through the eyes of each of said clips, said clips being formed of a relatively soft flexible metal whereby the ends of the shank portion may be bent over to securely hold the fender welt in position.

5. A fender welt comprising plastic tubing, a plurality of clips having an elongated flat shank portion and a rolled-over eye adjacent one end thereof, each of said eyes being of a size to be positioned within said tubing, and an elongated member extending through said tubing and through the eyes of each of said clips, said clips being formed of a relatively soft flexible metal whereby the ends of the shank portion may be bent over to securely hold the fender welt in position.

6. A fender welt comprising plastic tubing, a plurality of clips having an elongated flat shank portion and a portion adjacent one end positioned within said tubing, and means for securing said end portion within said tubing, said clips being formed of a relatively soft flexible metal whereby the ends of the shank portion may be bent over to securely hold the fender welt in position.

7. A fender welt comprising plastic tubing having a plurality of slits extending through the side walls thereof, said slits being spaced along one side of said tubing, a plurality of clips having an elongated flat shank portion and a rolled-over eye adjacent one end thereof, each of said eyes being of a size to be inserted through one of said slits and positioned within said tubing, and an elongated member extending through said tubing and through the eyes of each of said clips.

8. A fender welt comprising tubing having a plurality of slits extending through the side walls thereof, a plurality of clips having an elongated flat shank portion and a rolled-over eye adjacent one end thereof, each of said eyes being of a size to be positioned within said tubing with said shank extending outwardly through one of said slits, and an elongated member extending through said tubing and through the eyes of each of said clips.

9. A fender welt comprising a flexible tube having spaced slits through one side wall thereof, a plurality of clips each having an elongated flat shank portion and a rolled over eye adjacent one end thereof, a retention member on which the eyes of the clips are slidably received within the tube and with the shank portions of the clips extending through said slits.

10. A fender welt comprising a flexible tube having spaced openings through one side wall thereof providing communication between the interior and exterior of the tube, and a series of clips disposed in the openings in the tube each having an eye located within the tube, and an elongated retaining member retaining said eyes within said tube.

CHARLES D. WEST.

REFERENCES CITED

The following references are of record in the file of this patent:

UNITED STATES PATENTS

| Number | Name | Date |
| --- | --- | --- |
| 1,289,607 | Batchelder | Dec. 31, 1918 |
| 2,483,622 | Burski | Oct. 4, 1949 |
| 2,523,223 | Martin | Sept. 19, 1950 |